United States Patent [19]
Schöll et al.

[11] 3,927,248
[45] Dec. 16, 1975

[54] OVERHEAD CABLE SYSTEM FOR POWER OR INFORMATION TRANSMISSION

[76] Inventors: Günter Schöll, Casa Rosina, CH 6549 Pianezzo, Paudo, Switzerland; Joachim Pauls, Meisenweg 3, 7441 Wolfschlugen, Wurtt., Germany

[22] Filed: Apr. 8, 1974

[21] Appl. No.: 459,056

[30] Foreign Application Priority Data
Apr. 10, 1973 Germany............................ 2317894

[52] U.S. Cl. .................. 174/41; 174/146; 174/160; 174/212
[51] Int. Cl.² . H02G 7/06; H02G 7/12; H01B 17/54
[58] Field of Search ......... 174/40 R, 41, 42, 43, 44, 174/45 R, 70 A, 146, 160, 187, 212; 191/40, 41; 248/58, 61

[56] References Cited
FOREIGN PATENTS OR APPLICATIONS

| | | | |
|---|---|---|---|
| 1,174,383 | 7/1964 | Germany.............................. | 174/41 |
| 2,129,843 | 12/1972 | Germany.............................. | 174/41 |
| 2,143,134 | 3/1973 | Germany.............................. | 174/41 |

*Primary Examiner*—Laramie E. Askin
*Attorney, Agent, or Firm*—Karl F. Ross; Herbert Dubno

[57] ABSTRACT

A pair of upright towers spaced apart by a predetermined distance are spanned by a cable system comprising at least one synthetic-resin support strand (monofilament or multifilament) having a length in an unstressed condition which is shorter by several percent than the distance between the towers and at least one conductive strand having a length in an unstressed condition which is greater than the distance between the towers. A plurality of holders are spaced apart along the cables and are each formed with a central seat which tightly receives and holds the support strand and with two or more outer seats which each loosely and slidably receives a respective conductive strand. The seats for the conductive strands are lined with polytetrafluoroethylene and cooling ribs are formed on the holder between the outer seats and the central seat to limit heat transmission to the central support strand. The central synthetic-resin support strand can be of elliptical cross section or may be constituted by a large-diameter central strand and a pair of small-diameter flanking strands. The support strand preferably has a length of more than 1%, preferably between 3 and 10% (with best results at 5.3%) less than the straight-line distance between attachment points on the towers and the conductive strands have a length at most 1%, preferably 0.05 to 0.5% (with best results at 0.13%) greater than this distance.

10 Claims, 4 Drawing Figures

OVERHEAD CABLE SYSTEM FOR POWER OR INFORMATION TRANSMISSION

FIELD OF THE INVENTION

The present invention relates to an overhead transmission system and, more particularly, to an overhead cable system for transmitting electrical energy or signals for power or information.

BACKGROUND OF THE INVENTION

As a rule, high-energy electric power is transmitted over long distances by means of overhead cable systems. The cable is spanned between tall towers or masts (pylons). For maximum safety and economy of operation the masts must be as far apart and as tall as possible.

The straight-line distance between the towers, i.e., the span length, in such a system is largely determined by the tensile strength and the weight per unit length of the conductive cables or strands used. The energy-carrying capacity of the conductive strand or cable is largely determined by its conductivity and cross section, and generally cables having a relatively large weight per unit length must be used for optimum transmission efficiency. It has been suggested to use a conductive cable comprising a steel core of high tensile strength surrounded by aluminum or copper conductors with relatively low tensile strength but relatively high current-transmission capacity. Such a cable has, however, a relatively large weight per unit length so that the span length is inherently short.

It is also known to use a synthetic-resin support strand which is connected to parallel conductive strands via clamps or holders. This synthetic-resin strand cannot be incorporated into the conductive strand since this conductor occasionally heats up so that the synthetic-resin strand can be adversely affected. This synthetic-resin strand is of the longitudinally oriented type that has a relatively small modulus of elasticity. In order that the conductive cables not break when loaded with ice or the like, since their modulus of elasticity will be considerably higher than that of the synthetic-resin strand, it has been necessary to alter the modulus of elasticity of at least one of these strands so that it approaches that of the other strand. This is effected in known embodiments by winding the wires of the conductive strand all in the same helical direction so as to make in effect a spring of this conductor having a modulus of elasticity which is considerably higher than that of a conventional cable conductor. Such an arrangement, however, has the considerable disadvantage that a cable of this type presents a relatively long current path and therefore generates considerable electrical losses.

OBJECTS OF THE INVENTION

It is therefore an object of the present invention to provide an improved overhead transmission system.

Another object is the provision of such a system usable for electricity either for the transmission of power or information.

Yet another object is to provide a system which is relatively inexpensive and which allows a maximum span distance to be employed.

SUMMARY OF THE INVENTION

These objects are attained in an overhead system for transmitting electrical energy, according to the present invention, comprising at least two upright towers spaced apart by a predetermined distance, and spanned by at least one synthetic-resin support strand having a length in a longitudinally unstressed condition shorter than the straight-line distance between the towers and at least one conductive strand having a length in a longitudinally unstressed condition longer than the distance between the towers. A plurality of holders are provided which connect the two strands together so that in effect the conductive strand is hung on the support strand.

The synthetic-resin support strand according to this invention is a mono- or multifilament and is several percent (e.g. 1 to 10%, preferably 3 to 10%) shorter than the span distance, that is the straight-line distance between strand attachment points on adjacent towers. The conductive strand is less than 1% (preferably 0.05 to 0.5%) longer than this straight-line distance. The monofilament or multifilament can be nylon or a polyester and is subjected under normal conditions to approximately 95% of the load which it can bear without breaking. This means that the synthetic-resin support strand and the relatively inextensible conductive strand will both elongate or stretch to the same extent should the system become loaded with ice, moisture, or the like. Thus in a normal unloaded system the support strand will be very tight, whereas the conductive strand or strands supported thereby by longitudinally spaced holders will be under very little load. Thus it is possible to employ a conductive strand or cable which has relatively low tensile strength.

In accordance with another feature of this invention each holder has a central region formed with a seat in which the support strand is tightly clamped and at least two arms extending from the central region each provided with a respective outer seat. The conductive strand is loosely received and guided by this outer seat, so that it is slidable therein. In this system under normal, unloaded, conditions the support strand will assume a regular catenary shape, and the conductive strands will effectively loop from holder to holder. When the system is loaded, however, the relatively high modulus of elasticity of the support strand will allow it to stretch considerably until the slack is taken up in the conductive strands and these strands, which have relatively high modulus of elasticity, start to support their own weight at least partially. The ability of the conductive strands to slide within the holders prevents forces in the strands from acting against one another and thereby causing damage to the system. The modulus of elasticitity of the various strands is chosen so that they will all reach maximum stretch at the same time, thus no one of the cables or strands will break before the other so that the system can be loaded to a maximum.

According to further features of this invention the outer seats for the conductive cables are at least lined with a material which is softer or has a lower coefficient of sliding friction than these conductive strands so that wear of these strands is reduced to a minimum. In particular a synthetic-resin lining of the seat is provided, using a material such as polytetrafluoroethylene, sold under the trademark TEFLON. In addition each of the arms is formed between the seat carrying the conductive cable and the seats carrying the support cable with transverse cooling ribs which prevent heat from being transmitted to the support cable, since this element is relatively heat sensitive.

In accordance with yet another feature of this invention the support cable is wider than it is high, that is its dimension transverse to its length and parallel to the horizontal is substantially greater than its vertical height (thickness). In this manner the wind resistance of the cable is reduced considerably. The support cable may be of elliptical cross section, or formed by a relatively large-diameter central strand flanked by two small-diameter outer strands.

The system according to this invention has the considerable advantage that, due to the small but nonetheless unavoidable friction between the conductive cables and their holders, the system is highly wind resistant. This is because any vibration in the system caused by wind is quickly damped by the rubbing of the conductive cables in their holders.

BRIEF DESCRIPTION OF THE DRAWING

The above and other objects, features, and advantages of the present invention will become more readily apparent from the following description, reference being made to the accompanying drawing in which.

SPECIFIC DESCRIPTION

Figure 1:
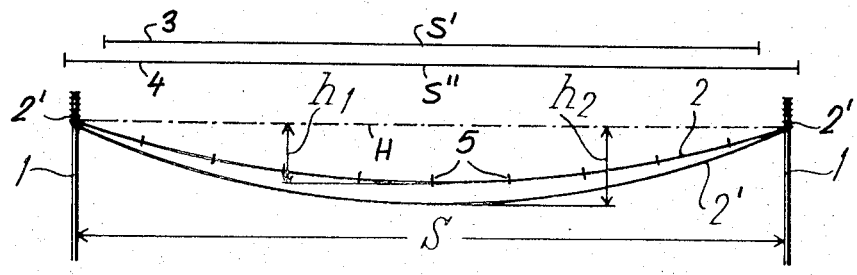
FIG. 1 is a diagrammatic side elevational view of a span of the system according to the present invention.
Figure 2:
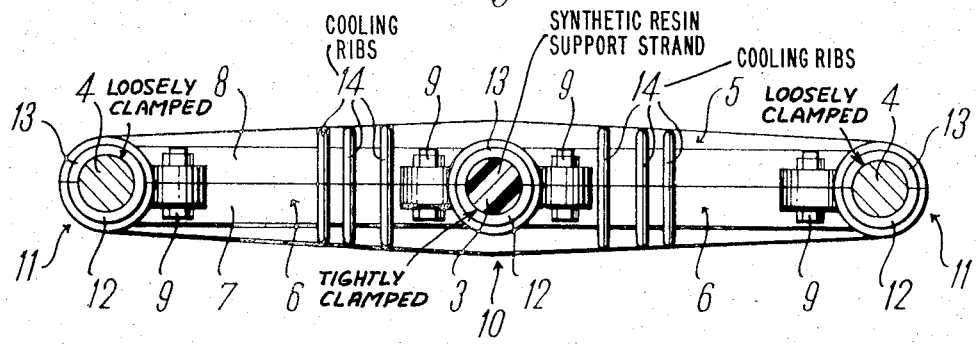
FIGS. 2 and 3 are end sectional views of holders in accordance with this invention.

As shown in FIG. 1, a span of the system has an overall length S defined between a pair of upright masts 1. A cable assembly 2 spans this distance S and normally hangs a distance $h_1$ below an imaginary horizontal line H drawn between the two attachment points 2' of the cable system 2 on the masts 1. The cable system 2 comprises as shown in FIG. 2 a central support strand 3 flanked by a pair of conductive strands 4 held together by holders 5 spaced along the cable assembly 2.

Each holder 5 has a pair of like arms 6 and is formed from a pair of like halves 7 and 8, advantageously made of fiberglass reinforced synthetic-resin material. Bolts 9 secure the two halves 7 and 8 together. A seat 10 at the center of the holder 5 tightly clamps the support strand 3 and a pair of like Teflon-lined seats 11 at the ends of the arms 6 loosely clamp the conductive strands 4. Each seat 10, 11 is formed by a pair of semicylindrical halves 12 and 13 carried on the halves 7 and 8 of the holder 5. Cooling ribs 14 extending transversely to the longitudinal axis of the holder 5, and therefore parallel to the strands 3 and 4, are provided unitarily on each arm 6 between the seat 10 and the respective seat 11.

Figure 4:
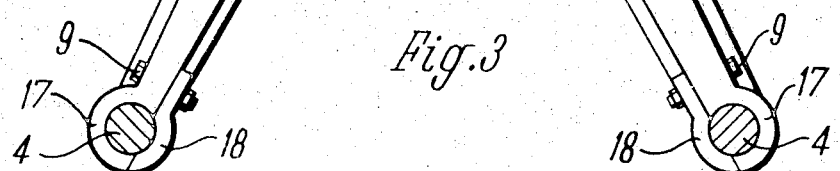
FIG. 4 is a detail of another configuration of the system in accordance with this invention.

As shown in FIG. 4 a support strand 3' of elliptical cross section can be clamped in a correspondingly shaped seat 10' between an upper half 13' and a lower half 12'. Such a strand 3' has nominal wind resistance, since the width W of the strand 3', which is in line with the normal wind direction, is greater than its height h.

Figure 3:
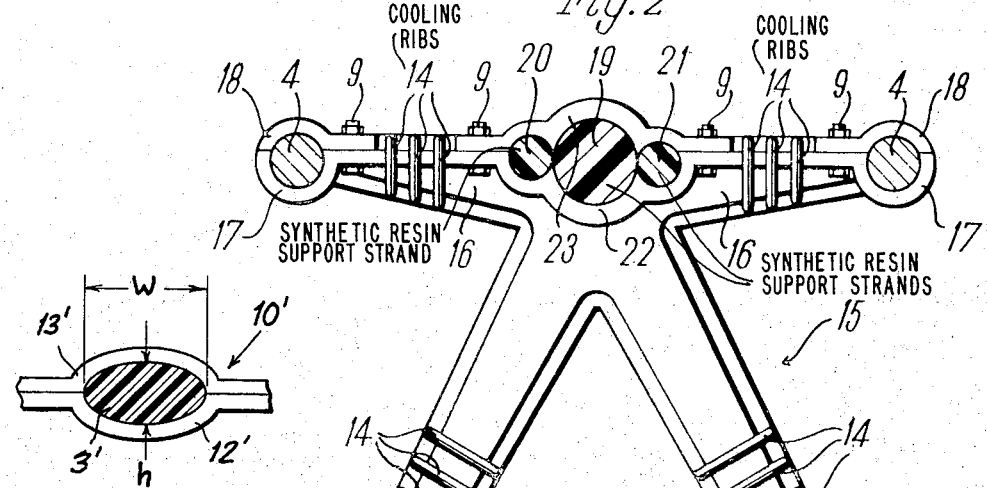

As is shown in FIG. 3 a holder 15 can be used which in addition to two arms 16 similar to the arms 6 has two lower arms 16' so that four conductive cables 4 can be carried. The support strand here is comprised of a large-diameter central strand 19 flanked by small-diameter strands 20 and 21 clamped between a lower seat half 22 and an upper seat half 23. The strands 4 are received in seats 17 and held in place therein by clamping elements 18 secured over these seats via the bolts 9. Cooling ribs 14 are formed on all of the arms 16, 16' as described with reference to FIG. 2.

The support cable 3 is in this case a polyester multifilament and has a length S' between 1 and 10% shorter than the distance S between attachment points on the masts 1. More particularly, this strand 3 has an overall length S' equal to 0.947 S. The metal conductive strands 4 have a length S'' greater than the distance S by up to 1%. In the described embodiment S'' equals 1.0013 S. Thus in the system described with a distance S = 300 meters the support strand has a length S' of 284.1 meters and the conductive strand 4 has a length S' of 300.39 meters.

It should be noted that the cables 3 and 4 in FIGS. 1 and 2 are generally parallel to each other so that they lie one behind the other or in the so-called wind shadow of each other. When the system is loaded with ice so that it droops by a distance of $h_2$, the strands 3 and 4 will run exactly parallel to each other. In this position the conductive and support strands lie relative to each other three quarters in the wind shadow.

We claim:

1. An overhead system for transmitting electricity comprising:
    a pair of upright towers spaced apart by a predetermined distance;
    at least one synthetic-resin support strand extending between said towers and having a length in an unstressed condition less than said distance;
    at least one conductive strand extending between said towers next to said support strand and having a length in an unstressed condition greater than said distance; and
    means securing said strands together between said towers.

2. The system defined in claim 1 wherein said support strand is 1 to 10% shorter than said distance and said conductive strand is up to 1% longer than said distance.

3. The system defined in claim 2 wherein said means comprises a plurality of holders extending generally transverse to said strands and each holder having means securing same tightly to said support strand, thereby making said holder unslidable relative to said support strand, and each holder also having means securing same loosely to said conductive strand, thereby making said conductive strand slidable relative to said holder.

4. The system defined in claim 3 wherein each holder has a central region and at least two arms extending from said central region, said central region being formed with a seat and provided with said means tightly securing said support strand to said holder, said arms each being formed with a seat loosely receiving a respective conductive strand.

5. The system defined in claim 4 wherein all of said seats are generally cylindrical in shape and formed partly of a removable clamping element.

6. The system defined in claim 5 wherein said holders are made at least at said seats for said conductive strands, of a material softer than the material of said conductive strands.

7. The system defined in claim 6 wherein said seats for said conductive strands are lined with polytetrafluoroethylene.

8. The system defined in claim 5 wherein said arms of each holder are formed between the seats for said conductive strands and the seat for said support strand with transverse cooling ribs.

9. The system defined in claim 1 wherein said support strand is of greater width measured generally parallel to the horizontal than vertical height.

10. The system defined in claim 9 wherein said support strand is formed of a relatively large-diameter central strand and a pair of relatively small-diameter side strands horizontally flanking said central strand.

* * * * *